(12) United States Patent
Register, III et al.

(10) Patent No.: US 9,170,389 B2
(45) Date of Patent: Oct. 27, 2015

(54) HYBRID FIBER OPTIC CABLE SYSTEMS

(75) Inventors: James Arthur Register, III, Hickory, NC (US); William Welch McCollough, Newton, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 163 days.

(21) Appl. No.: 13/596,256

(22) Filed: Aug. 28, 2012

(65) Prior Publication Data

US 2014/0064679 A1 Mar. 6, 2014

(51) Int. Cl.
*G02B 6/44* (2006.01)
*H01B 11/22* (2006.01)
*G02B 6/38* (2006.01)

(52) U.S. Cl.
CPC .............. *G02B 6/4416* (2013.01); *H01B 11/22* (2013.01); *G02B 6/3817* (2013.01); *G02B 6/4401* (2013.01); *G02B 6/443* (2013.01)

(58) Field of Classification Search
CPC .... G02B 6/4401; G02B 6/4416; G02B 6/443; G02B 6/4479
USPC .............. 385/75, 88, 100, 101, 106, 109, 110
See application file for complete search history.

(56) References Cited

U.S. PATENT DOCUMENTS

| | | |
|---|---|---|
| 4,038,489 A | 7/1977 | Stenson et al. |
| 4,172,106 A | 10/1979 | Lewis |
| 4,984,869 A | 1/1991 | Roche |
| 5,050,957 A | 9/1991 | Hamilton et al. |
| 5,138,685 A | 8/1992 | Arroyo et al. |
| 5,319,730 A | 6/1994 | Rasanen et al. |
| 5,469,523 A | 11/1995 | Blew et al. |

(Continued)

FOREIGN PATENT DOCUMENTS

| | | |
|---|---|---|
| AU | 740507 B2 | 2/1999 |
| DE | 19628457 A1 | 1/1998 |

(Continued)

OTHER PUBLICATIONS

Raymer et al., "Spontaneous Knotting of an agitated string," PNAS, vol. 104, No. 42, The National Academy of Sciences of the USA, Oct. 16, 2007, pp. 16432-16437.

(Continued)

*Primary Examiner* — Kaveh Kianni
*Assistant Examiner* — Hung Lam
(74) *Attorney, Agent, or Firm* — William D. Doyle

(57) ABSTRACT

Hybrid fiber optic cables including one or more electrical coaxial subassembly allowing for fiber movement to reduce attenuation during bending are disclosed. Related connectorized cables and systems are also disclosed. The hybrid fiber optic cables include both one or more coaxial subassembly and optical fibers to provide both optical and electrical connectivity as part of a connectorized system. Use of one or more coaxial subassembly reduces impedance variations and lowers cost. Each coaxial sub-assembly also includes multiple electrical conductors to increase electrical connectivity capacity (e.g., power and signals) of the hybrid cable, as needed or desired. Further, the hybrid cable may include a channel with optical fiber(s) of the hybrid cable disposed therein, free of attachment to the channel. The channel allows the optical fibers to move relative to the cable jacket and control bend radius to reduce optical attenuation when the hybrid fiber optic cable is bent.

11 Claims, 11 Drawing Sheets

(56) References Cited

U.S. PATENT DOCUMENTS

| | | | |
|---|---|---|---|
| 5,509,097 A | 4/1996 | Tondi-Resta et al. | |
| 5,542,020 A | 7/1996 | Horska | |
| 5,651,081 A * | 7/1997 | Blew et al. | 385/101 |
| 5,668,912 A | 9/1997 | Keller | |
| 5,740,295 A | 4/1998 | Kinard et al. | |
| 5,883,517 A * | 3/1999 | Broyde et al. | 324/522 |
| 5,960,144 A | 9/1999 | Klumps et al. | |
| 5,970,196 A | 10/1999 | Greveling et al. | |
| 5,999,676 A | 12/1999 | Hwang | |
| 6,041,153 A | 3/2000 | Yang | |
| 6,137,935 A | 10/2000 | Bohme et al. | |
| 6,141,472 A | 10/2000 | Ishikawa et al. | |
| 6,198,865 B1 | 3/2001 | Risch | |
| 6,241,920 B1 | 6/2001 | Cotter et al. | |
| 6,249,629 B1 | 6/2001 | Bringuier | |
| 6,314,224 B1 | 11/2001 | Stevens et al. | |
| 6,343,172 B1 | 1/2002 | Schiestle et al. | |
| 6,377,738 B1 | 4/2002 | Anderson et al. | |
| 6,430,344 B1 | 8/2002 | Dixon et al. | |
| 6,434,304 B2 | 8/2002 | Gao et al. | |
| 6,519,396 B2 | 2/2003 | Schneider et al. | |
| 6,618,526 B2 | 9/2003 | Jackman et al. | |
| 6,687,437 B1 | 2/2004 | Starnes et al. | |
| 6,738,547 B2 | 5/2004 | Spooner | |
| 6,785,452 B2 | 8/2004 | Yasutomi | |
| 7,127,144 B2 | 10/2006 | Lee | |
| 7,289,704 B1 * | 10/2007 | Wagman et al. | 385/100 |
| 7,627,218 B2 | 12/2009 | Hurley | |
| 7,643,713 B2 | 1/2010 | Buthe et al. | |
| 7,778,510 B2 | 8/2010 | Aronson et al. | |
| 7,787,727 B2 | 8/2010 | Bringuier et al. | |
| 7,920,764 B2 | 4/2011 | Kewitsch | |
| 2002/0041743 A1 | 4/2002 | Schneider et al. | |
| 2002/0126967 A1 | 9/2002 | Panak et al. | |
| 2002/0141713 A1 | 10/2002 | Okada et al. | |
| 2002/0159727 A1 | 10/2002 | Okada et al. | |
| 2003/0023247 A1 | 1/2003 | Lind et al. | |
| 2003/0072545 A1 | 4/2003 | Kusakari et al. | |
| 2003/0118298 A1 | 6/2003 | Matsuyama et al. | |
| 2003/0165310 A1 | 9/2003 | Moon et al. | |
| 2003/0235379 A1 | 12/2003 | Lin | |
| 2005/0017495 A1 | 1/2005 | Arnold | |
| 2006/0088251 A1 | 4/2006 | Wang et al. | |
| 2006/0291787 A1 | 12/2006 | Seddon | |
| 2008/0037941 A1 * | 2/2008 | Mallya et al. | 385/101 |
| 2008/0037942 A1 | 2/2008 | Tatat | |
| 2010/0008631 A1 | 1/2010 | Herbst | |
| 2010/0209058 A1 | 8/2010 | Ott | |
| 2010/0316340 A1 | 12/2010 | Sales Casals et al. | |
| 2010/0329614 A1 | 12/2010 | Keller et al. | |
| 2011/0083898 A1 | 4/2011 | Miller, III | |
| 2011/0229097 A1 | 9/2011 | Roberts et al. | |
| 2012/0301090 A1 | 11/2012 | Cline et al. | |
| 2012/0315004 A1 | 12/2012 | Register et al. | |
| 2012/0328253 A1 | 12/2012 | Hurley et al. | |
| 2013/0188916 A1 | 7/2013 | Bradley et al. | |

FOREIGN PATENT DOCUMENTS

| | | |
|---|---|---|
| DE | 29716946 U1 | 1/1999 |
| EP | 0676654 A2 | 10/1995 |
| EP | 0945876 A1 | 9/1999 |
| EP | 0767754 B1 | 7/2000 |
| EP | 1061394 B1 | 12/2000 |
| FR | 2555764 A1 | 5/1985 |
| GB | 2233788 A | 1/1991 |
| JP | 0320704 A | 1/1991 |
| JP | 0352529 A | 3/1991 |
| JP | 07174949 A | 7/1995 |
| JP | 09152529 A | 6/1997 |
| JP | 11160594 A | 6/1999 |
| JP | 2000276955 A | 10/2000 |
| WO | 0198810 A1 | 12/2001 |

OTHER PUBLICATIONS

Notice of Allowance for U.S. Appl. No. 13/559,102 mailed Sep. 27, 2013, 10 pages.

* cited by examiner

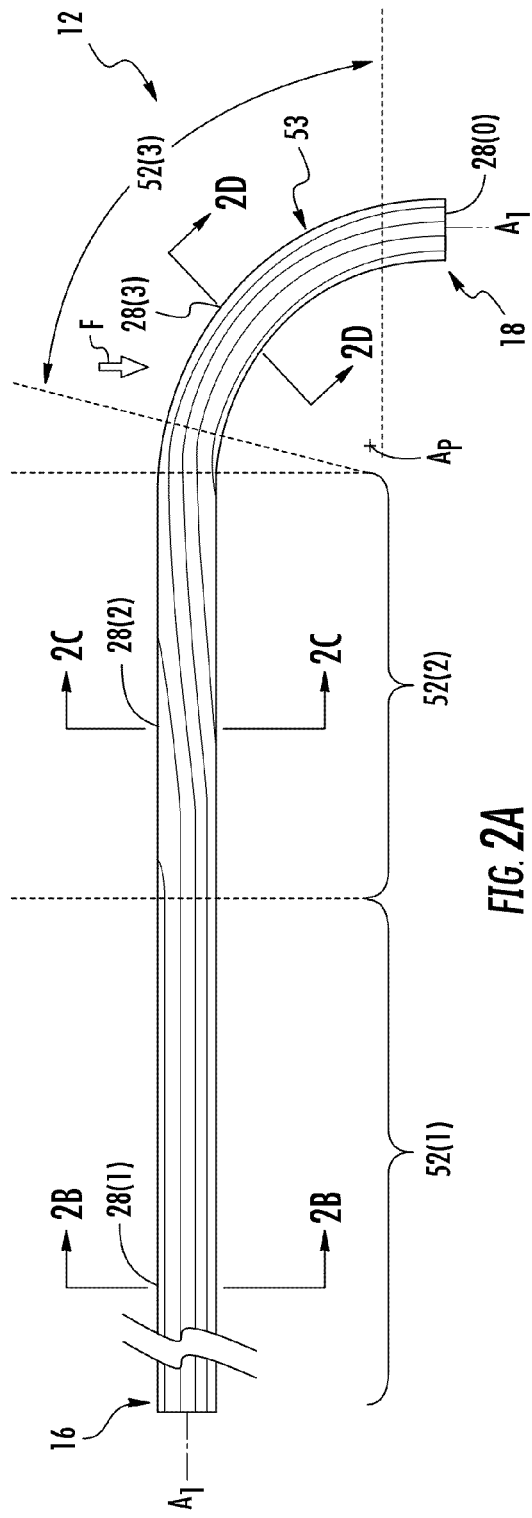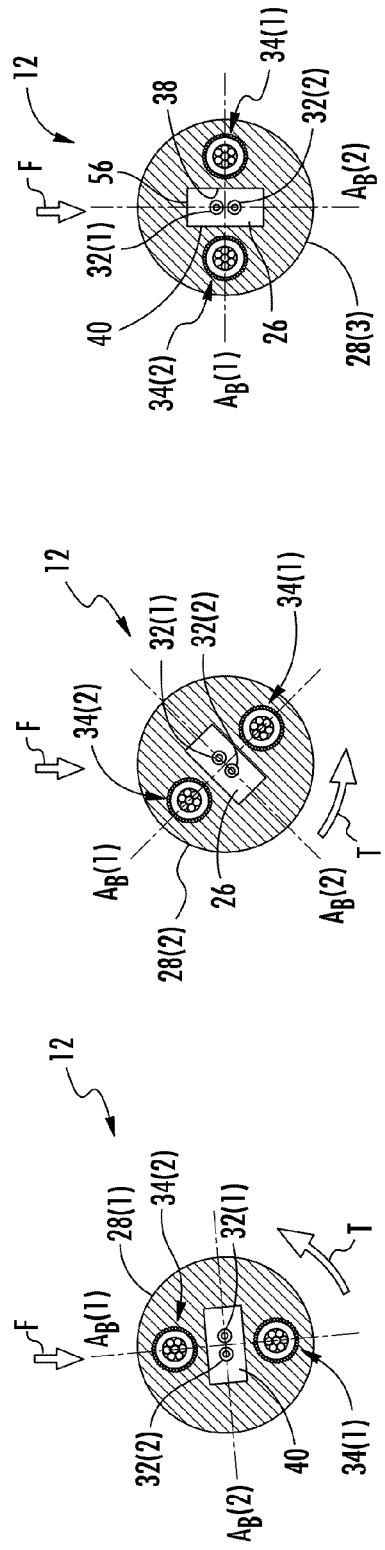

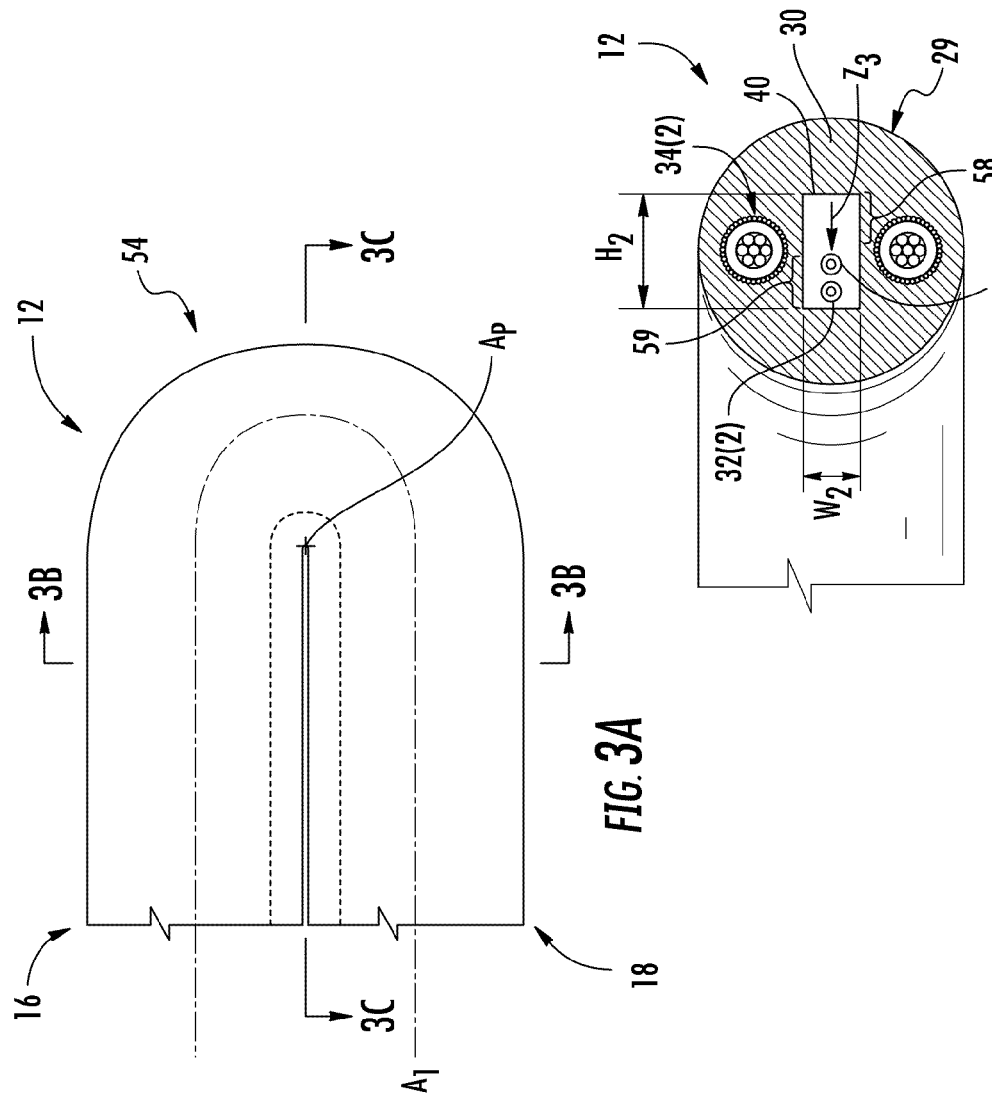

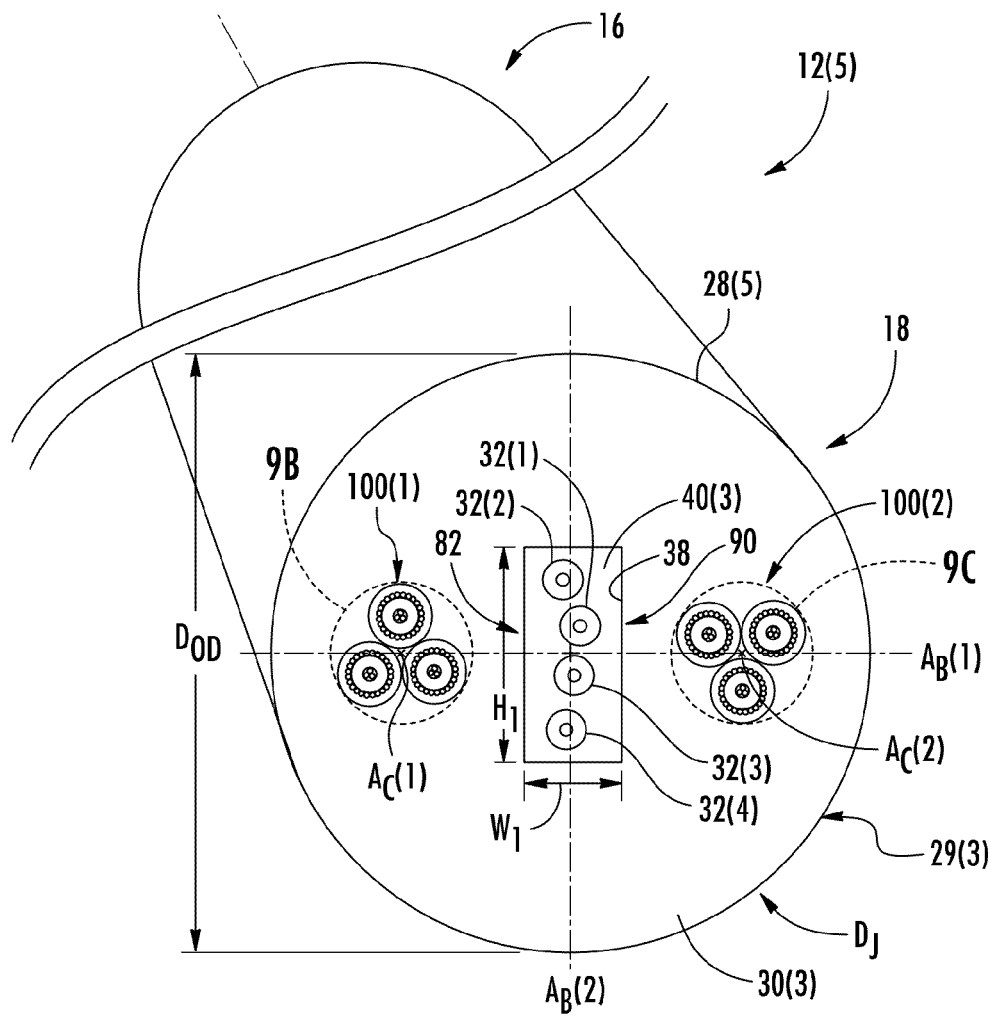
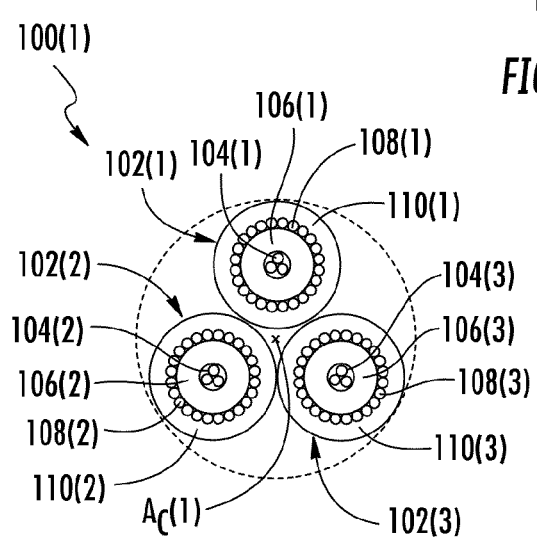
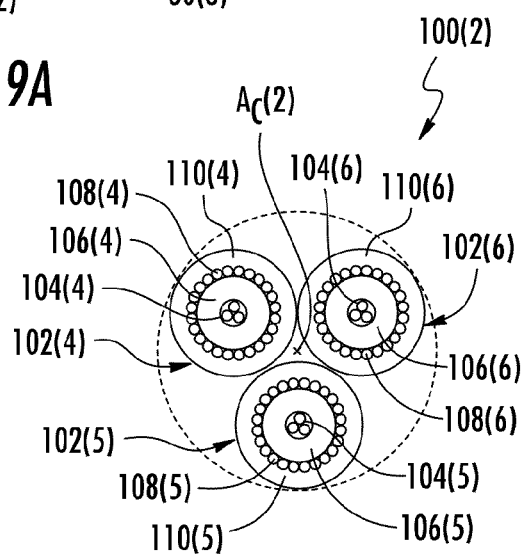

HYBRID FIBER OPTIC CABLE SYSTEMS

BACKGROUND

1. Field of the Disclosure

Technology of the disclosure relates to hybrid fiber optic cables, in some cases, comprising multiple optical fibers and electrical conductors disposed in a cable jacket to support optical and electrical connections.

2. Technical Background

Benefits of optical fibers include extremely wide bandwidth and low noise operation. In applications where high bandwidth and electrical conductor interconnectivity is desired, hybrid fiber optic cables may be employed. Hybrid fiber optic cables include one or more optical fibers capable of transporting signals optically at high bandwidths. Hybrid cables also include one or more electrical conductors capable of carrying electrical energy, such as signals and/or power as an example. These hybrid cables may be employed in devices, such as user devices, to provide optical and electrical signal connectivity.

Device manufacturers and users of these devices may continue to provide applications that require the delivery of more bandwidth and/or additional electrical conductors for additional electrical signal functionality. Adding additional bandwidth capability may be provided by incrementally adding more optical fibers. Additional electrical conductor conductivity may be provided by incrementally adding more electrical conductors. In either case, incrementally adding more optical fibers and/or electrical conductors in a hybrid cable can cause issues. Providing additional optical fibers and/or electrical conductors in a cable jacket that may be required to maintain a small outer diameter (such as for portable devices) may collectively cause the hybrid cable to either be too stiff or susceptible to breakage issues. Further, the optical fibers in the hybrid may also be subjected to severe bends, including pinch bends, when the optical fibers are bent.

Further, connectorized cables including optical fibers and electrical conductors may not be efficient. The inefficiency occurs because of interference factors, for example, stray capacitance, which causes the impedance of connectorized systems to vary from ideal. Traditional methods of controlling impedance by merely insulating each separate electrical conductor subassembly may result in hybrid fiber optic cables that are too stiff and/or too thick to easily use, store, and/or transport and thereby may be inadequate for mobile use.

A new connectorized system is desired to provide electrical and/or optical connections to one or more optical devices or hubs. The new connectorized system may be flexible, have a small diameter form-factor, and be bend-tolerant to support mobile personal use. The new connectorized system may also be more efficient than other hybrid cable designs by better controlling the impedance of the connectorized system while being easier to store and transport, and yet be cost effective for consumers to purchase.

SUMMARY OF THE DETAILED DESCRIPTION

Embodiments disclosed herein include hybrid fiber optic cables including one or more electrical coaxial subassembly allowing for fiber movement to reduce attenuation during bending. Related connectorized cables and systems are also disclosed. The hybrid fiber optic cables include both one or more coaxial subassembly and optical fibers to provide both optical and electrical connectivity as part of a connectorized system. Use of one or more coaxial subassembly reduces impedance variations and lowers cost. Each coaxial sub-assembly also includes multiple electrical conductors to increase electrical connectivity capacity (e.g., power and signals) of the hybrid cable, as needed or desired. Further, the hybrid cable may include a channel with one or more optical fibers of the hybrid cable disposed therein, free of attachment to the channel. The channel allows the optical fibers to move relative to the cable jacket and control bend radius to reduce optical attenuation when the hybrid fiber optic cable is bent.

The cable jacket includes a channel configured to allow the optical fibers to move with respect to the channel to reduce attenuation during bending. The coaxial cables are embedded within the cable jacket and may be used to carry electrical signals. The hybrid fiber optic cables may be connectorized and may also be configured to support optical connections to multiple hubs or devices. The at least one coaxial subassembly of the hybrid fiber optic cables may also facilitate efficient electrical connections to the hubs or devices by controlling impedance and provide a bend preference to the cable that facilitates bending so that the fibers move about a major axis of the channel.

In one embodiment, a hybrid fiber optic cable allowing for optical fiber movement to reduce attenuation during bending is disclosed. The hybrid fiber optic cable may include a cable jacket having a channel disposed therein. The channel may be configured to allow optical fiber movement relative to the channel to reduce attenuation during bending. The hybrid fiber optic cable may also include at least one optical fiber which is disposed within the channel and free of attachments to the channel. The at least one optical fiber is configured to carry optical signals. The hybrid fiber optic cable may also include at least one coaxial subassembly embedded within the cable jacket. The at least one coaxial subassembly is configured to carry electrical signals. In this manner, the hybrid fiber optic cable may have reduced optical attenuation when subjected to a pinch bend.

In another embodiment, a connectorized hybrid fiber optic cable allowing for optical fiber movement to reduce attenuation during bending is disclosed. The connectorized hybrid fiber optic cable may include a hybrid fiber optic cable. The hybrid fiber optic cable may include a cable jacket having a channel disposed therein. The channel may be configured to allow optical fiber movement relative to the channel to reduce attenuation during bending. The hybrid fiber optic cable may also include at least one optical fiber disposed within the channel and free of attachments to the channel. The at least one optical fiber may be configured to carry optical signals. The hybrid fiber optic cable may also include a first coaxial subassembly and a second coaxial subassembly that are embedded within the cable jacket and configured to carry electrical signals. The connectorized hybrid fiber optic cable may also include a connector comprising at least one hub attached to an end of the hybrid fiber optic cable. The at least one hub may include at least one electrical port electrically coupled to the at least one coaxial subassembly and at least one optical port optically coupled to the at least one optical fiber. In this manner, the connectorized fiber optic cable may interconnect the conductors between coaxial subassemblies to optimize cost by using the inner conductors for electrical power and increasing the gauge of the outer conductors to provide additional power paths at different voltage configurations, support timing circuits, provide a ground, or shield circuits.

In another embodiment, a connectorized system is disclosed that includes a hybrid fiber optic cable. The hybrid fiber optic cable may include a protective layer having a channel disposed therein. The channel may be configured to allow optical fiber movement relative to the channel to reduce attenuation during bending. The hybrid fiber optic cable may include at least one optical fiber disposed within the channel and free of attachments to the channel. The at least one optical fiber may be configured to carry optical signals. The hybrid fiber optic cable may also include a first coaxial subassembly and a second coaxial subassembly embedded within the protective layer and configured to carry electrical signals. The connectorized system may also include at least one device electrically connected to an end of the hybrid fiber optic cable. The at least one device may include a plurality of electrical ports electrically coupled to the at least one coaxial subassembly and at least one optical port optically coupled to the at least one optical fiber. In this manner, the connectorized system may be controlled for impedance relative to the at least one device.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2A is a side view of the hybrid fiber optic cable of FIG. 1A;

FIGS. 2B-2D are sectional views at cross-sections of the hybrid fiber optic cable of FIG. 1A to illustrate a rotating of the hybrid fiber optic cable at a pinch bend to reduce optical attenuation by facilitating optical fiber movement;

FIG. 3A is a side view of a pinch bend of the hybrid fiber optic cable of FIG. 1A to illustrate a pinch bend;

FIGS. 3B and 3C are sectional views of the hybrid fiber optic cable of FIG. 3A near the pinch bend and at the pinch bend, respectively, to illustrate movement of optical fibers within a channel of the cable jacket to reduce optical attenuation during the pinch bend;

FIG. 9A is a perspective view of a further example of a hybrid fiber optic cable including a first cluster and second cluster of coaxial subassemblies symmetrically disposed about a channel of a cable jacket; and FIGS. 9B and 9C are partial views of FIG. 9A depicting close-ups of the first cluster and the second cluster, respectively.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include hybrid fiber optic cables including one or more electrical coaxial subassembly allowing for fiber movement to reduce attenuation during bending. Related connectorized cables and systems are also disclosed. The hybrid fiber optic cables include both one or more coaxial subassembly and optical fibers to provide both optical and electrical connectivity as part of a connectorized system. Use of one or more coaxial subassembly reduces impedance variations and lowers cost. Each coaxial sub-assembly also includes multiple electrical conductors to increase electrical connectivity capacity (e.g., power and signals) of the hybrid cable, as needed or desired. Further, the hybrid cable may include a channel with one or more optical fibers of the hybrid cable disposed therein, free of attachment to the channel. The channel allows the optical fibers to move relative to the cable jacket and control bend radius to reduce optical attenuation when the hybrid fiber optic cable is bent where the electrical conductors provide a bend preference for the cable about the minor axis of the channel so that the optical fibers move about the major axis of the cavity when the cable bends.

Figure 1A:
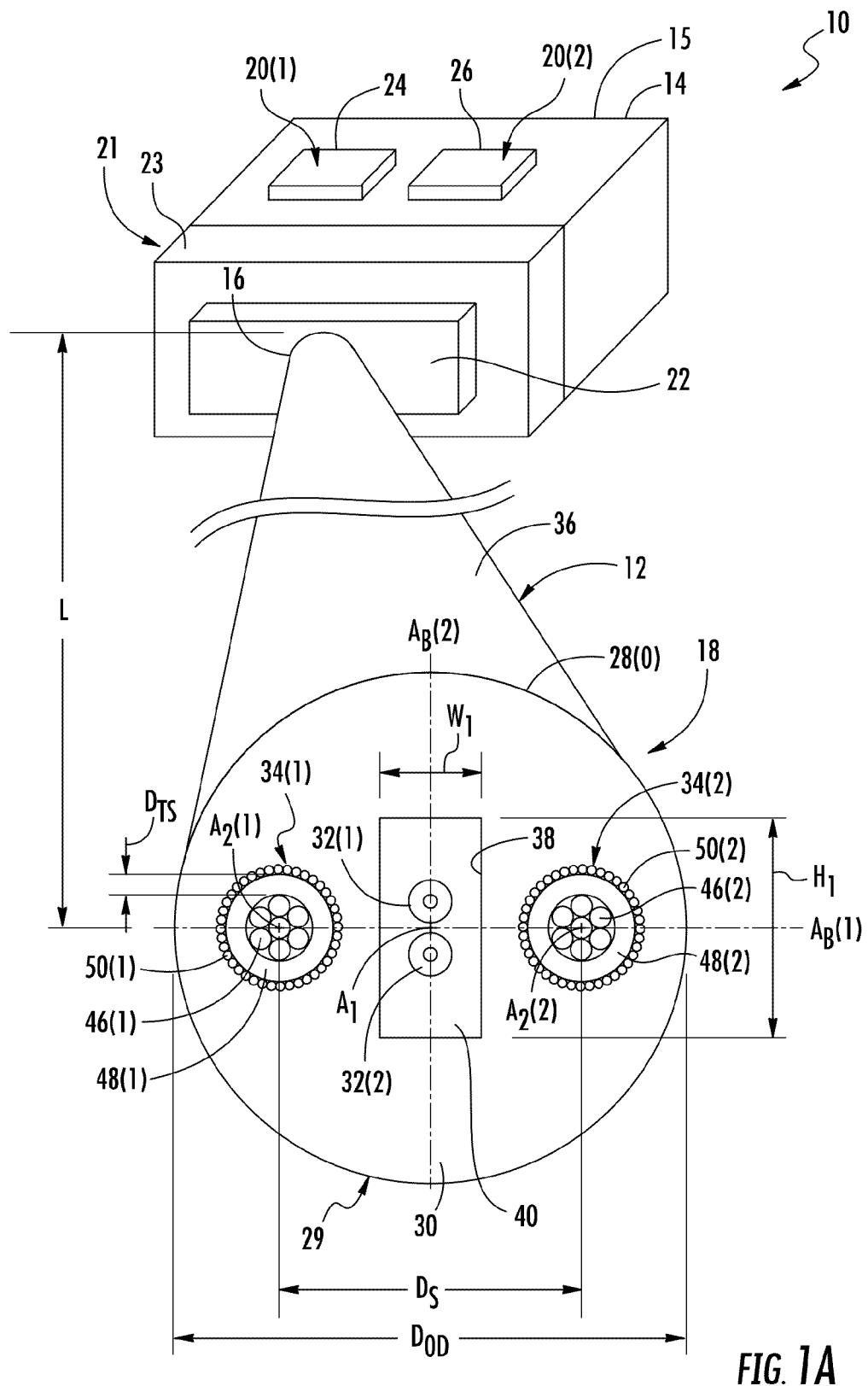
FIG. 1A is a perspective view of the an exemplary connectorized system including a hybrid fiber optic cable having electrical connectivity to control impedance and reduce cost.

In this regard, FIG. 1A depicts a perspective view of a connectorized system 10 including a hybrid fiber optic cable 12 and at least one connected device 14 electrically and optically connected to a first end 16 of the hybrid fiber optic cable 12. The hybrid fiber optic cable 12 extends from the first end 16 to a second end 18 along a longitudinal axis $A_1$. The hybrid fiber optic cable 12 provides an optical and electrical connection for the at least one device 14. The at least one device 14 may be, for example, a mobile device 15. The at least one device 14 may include circuits 20(1), 20(2) having electrical and/or optical connections to the hybrid fiber optic cable 12 through a fiber optic connector 22 having a fiber optic connector body 21. It is noted that in other embodiments there may be one circuit 20(1) or more than two circuits 20(1), 20(2). In the exemplary device 14 shown in FIG. 1A, the circuits 20(1), 20(2) may be, for example, an electro/optic converter 24 and a timing circuit 26, respectively, as non-limiting examples. The electro/optic converter 24 may be configured to convert optical signals from the hybrid fiber optic cable 12 to electrical signals and/or electrical signals from the device 14 to optical signals to be carried on the hybrid fiber optic cable 12.

Now that the basic components of the device 14 have been introduced, details of the hybrid fiber optic cable 12 will now be discussed. As discussed below, the hybrid fiber optic cable 12 includes a high density of electrical conductors in the form of coaxial subassemblies 34(1), 34(2) to provide additional electrical connectivity and impedance control as required for devices 14. Further, the coaxial subassemblies 34(1), 34(2) are embedded within a cable jacket 30 including a channel 40 which is rotated by the arrangement of coaxial subassemblies 34(1), 34(2) during sharp bends to reduce optical attenuation. As discussed below, the electrical conductors may be electrically connected within and between coaxial subassemblies 34(1), 34(2) to better control impedance.

Consistent with these features, FIG. 1A also shows an orthogonal cross-section 28(0) of the hybrid fiber optic cable 12. The orthogonal cross-section 28(0) is orthogonal to the longitudinal axis $A_1$ and depicts details of the hybrid fiber optic cable 12 which facilitates optical fiber movement relative to the channel 40. The movement of the optical fibers 32(1), 32(2) reduces attenuation during bending of the hybrid fiber optic cable 12. Details of the movement are discussed below in association with FIGS. 3B and 3C.

The hybrid fiber optic cable 12 includes a protective layer 29, at least one optical fiber 32(1), 32(2), and at least one coaxial subassembly 34(1), 34(2). Details of the protective layer 29 are discussed first. The protective layer 29 is a structure which protects the optical fibers 32(1), 32(2) and coaxial subassemblies 34(1), 34(2). In the example depicted in FIG. 1A, the protective layer 29 comprises a cable jacket 30. The cable jacket 30 may include multiple layers and may comprise, for example, a UV-curable matrix, buffer tube, and/or dielectric armor. The cable jacket 30 may be comprised of a polymer material which may be preferably strong, flexible, and resistant to creep. As discussed herein, the term "polymer material" indicates material comprised primarily of polymers, but allows for the inclusion of non-polymer additives and other materials, such as fire-retardant compounds and the inclusion of multiple polymers in a blend.

The cable jacket 30 may include an outer surface 36 forming an outer shape of the hybrid fiber optic cable 12. As depicted in the orthogonal cross-section 28(0) shown in FIG. 1A, the outer surface 36 may form a circular cross-sectional shape, for example, but other shapes are also possible, for example, a polygonal shape. The outer width or outer diameter $D_{OD}$ of the cable jacket 30 may be less than 3.5 millimeters, and preferably less than three (3) millimeters. In this manner, the outer surface 36 may extend from the first end 16 to the second end 18 of the hybrid fiber optic cable 12 to provide protection for the at least one optical fiber 32(1), 32(2) along an entire length L of the hybrid fiber optic cable 12 in a form factor conducive for mobile use.

Figure 1B:
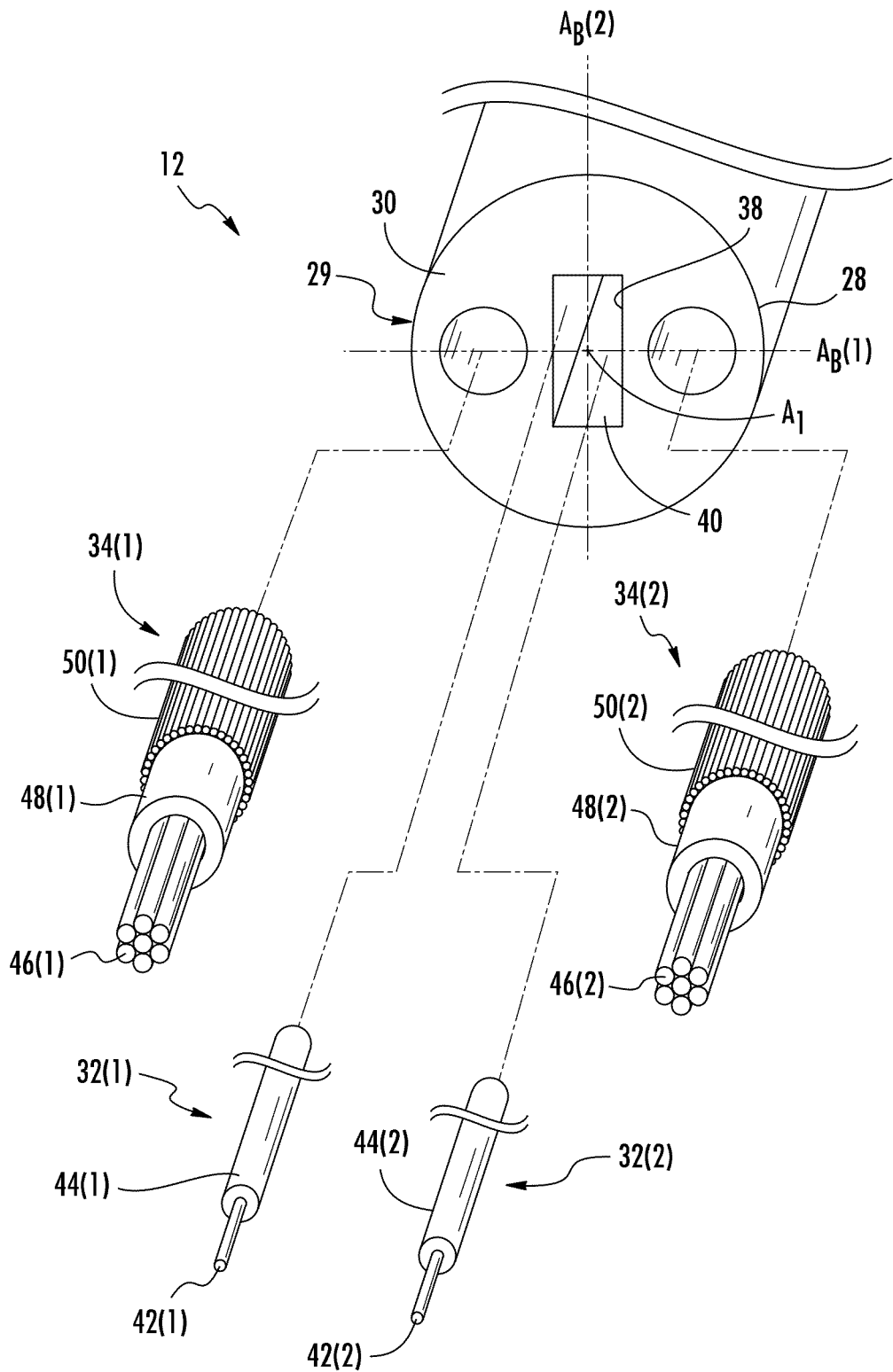
FIG. 1B is an exploded perspective view of the hybrid fiber optic cable of FIG. 1A.

As depicted in the exploded view provided by FIG. 1B, the cable jacket 30 may include an inner surface 38 therein. The inner surface 38 forms a channel 40 enclosed by the cable jacket 30. The channel 40 may extend the entire length L (FIG. 1A) of the hybrid fiber optic cable 12. The shape of the channel 40 may be selected to allow the optical fibers 32(1), 32(2) to move within the channel 40. As shown in FIG. 1A, the hybrid fiber optic cable 12 has the orthogonal cross-section 28(0) which may be bisected by a first axis $A_B(1)$ and bisected by a second axis $A_B(2)$ which is orthogonal to the first axis $A_B(1)$. The channel 40 may include a height $H_1$ that is generally measured along the second axis $A_B(2)$ and a width $W_1$ that may be measured along the first axis $A_B(1)$. The height $H_1$ may be greater than the width $W_1$ to allow the optical fibers 32(1), 32(2) to move within the channel 40 along the second axis $A_B(2)$ as will be discussed later in FIGS. 3A-3C. The width $W_1$ may be sized to allow one member of the optical fibers 32(1), 32(2) to move past a second member of the optical fibers 32(1), 32(2) when the one member moves parallel to the second axis $A_B(2)$. In this manner, the width $W_1$ may further facilitate movement of the optical fiber 32(1), 32(2).

With continuing references to FIGS. 1A and 1B, hybrid fiber optic cable 12 may also include the optical fiber 32(1), 32(2). It is noted that FIG. 1A depicts the optical fibers 32(1), 32(2) with two optical fibers; however, one or more than two optical fibers are also possible. The optical fibers 32(1), 32(2) may be single mode or multi-mode optical fibers. Likewise, other types of suitable optical fibers include bend-insensitive optical fibers, or any other expedient of a medium for transmitting light signals. The optical fibers 32(1), 32(2) may include at least one bare optical fiber 42(1), 42(2) which may be surrounded by a buffer layer 44(1), 44(2) to protect the optical fibers 32(1), 32(2) within the channel 40.

The optical fibers 32(1), 32(2) may be disposed within the channel 40 and free of attachments to the channel 40. Examples of attachments may be, for example, mechanical interference fits, cohesion bonds, or adhesion bonds. In this manner, the optical fibers 32(1), 32(2) may more freely move longitudinally, parallel to longitudinal axis $A_1$, and latitudinally within the channel 40. The optical fibers 32(1), 32(2) may be configured to carry optical signals from the first end 16 to the second end 18 of the hybrid fiber optic cable 12. The second end 18 of the hybrid fiber optic cable 12 may be optically connected to the device 14. It is noted that the first end 16 of the hybrid fiber optic cable 12 may be optically and electrically connected to a second device (not shown).

The hybrid fiber optic cable 12 may also include the coaxial subassemblies 34(1), 34(2) extending from the first end 16 to the second end 18 of the hybrid fiber optic cable 12. The coaxial subassemblies 34(1), 34(2) may be embedded within the cable jacket 30. Each of the coaxial subassemblies 34(1), 34(2) may comprise an inner conductor 46, an insulating layer 48 surrounding the inner conductor 46, and an outer conductor 50 surrounding the insulating layer 48. Coaxial subassemblies have many advantages over single conductor subassemblies in that additional conductors may be added without increasing the quantity of subassemblies. The inner conductor 46 and the outer conductor 50 of the coaxial subassemblies 34(1), 34(2) may be configured to carry electronic signals. The electronic signals may comprise electric power and/or electric communication signals.

The inner conductors 46(1), 46(2) may be made of an electrically conductive metallic material, for example copper, stainless steel, or other metal alloy. The outer conductors 50(1), 50(2) may be made of an electrically conductive material such as copper, stainless steel, or other metallic alloy. The outer conductors 50(1), 50(2) also may be in a form of a woven metallic braid. In this manner, the outer conductors 50(1), 50(2) may be more uniformly distributed over the insulating layers 48(1), 48(2), respectively.

The insulating layers 48(1), 48(2) may be a dielectric material providing spacing between the inner conductors 46(1), 46(2) and the outer conductors 50(1), 50(2), respectively. The dielectric material may have a low dielectric constant, for example as provided by the materials of polyethylene (PE), or polytetrafluoroethylene (PTFE). The thickness $D_{TS}$ of the dielectric material may determine the spacing between the inner conductor 46(1), 46(2) and the outer conductors 50(1), 50(2) and may be used to control impedance. The dielectric spacing thickness $D_{TS}$ may be, for example, ten (10) mils.

As shown in FIG. 1A, the coaxial subassemblies 34(1), 34(2) may be symmetrically disposed to each other in the orthogonal cross-section 28(0) by being equidistant from the second axis $A_B(2)$ and aligned relative to the second axis $A_B(2)$. In this manner, the hybrid fiber optic cable 12 may bend parallel to the second axis $A_B(2)$ as facilitated by the locations of the coaxial subassemblies 34(1), 34(2) and thereby minimize asymmetric deformation of the channel 40 which is aligned lengthwise with the second axis $A_B(2)$ and encourage movement of the optical fibers 32(1), 32(2) within the channel 40. For example, FIGS. 2A-2D show the hybrid fiber optic cable 12 with the portion sections 52(1), 52(2) and 52(3). The portion sections 52(1), 52(2) lead up to a bend 53 in the hybrid fiber optic cable 12. The bend 53 may be in the portion section 52(3) which is subjected to a bending force F. At an orthogonal cross-section 28(1) identified in FIG. 2A and shown in FIG. 2B, the second axis $A_B(2)$ is not aligned with the bending force F and thereby a torque T is applied as a result of the bending force F to the hybrid fiber optic cable 12 as shown in FIG. 2B. A second orthogonal cross-section 28(2) identified in FIG. 2A and shown in FIG. 2C within the portion section 52(2) of the hybrid fiber optic cable 12 also shows the torque T applied and the orthogonal cross-section 28(2) rotated relative to the orthogonal cross-section 28(1) so that the second axis $A_B(2)$ may be more closely aligned with respect to the bending force F. At the bend 53 in the portion section 52(3), an orthogonal cross-section 28(3) identified in FIG. 2A and shown in FIG. 2D depicts the second axis $A_B(2)$ aligned with the bending force F. In this manner, the hybrid fiber optic cable 12 may bend parallel to the second axis $A_B(2)$ and thereby facilitate the channel 40 to deform along the length $L_1$ of the channel 40 to minimize asymmetric bending of the channel 40 which may obstruct movement of the optical fibers 32(1), 32(2).

With reference back to FIG. 1A, the hybrid fiber optic cable 12 may also have symmetry to reduce attenuation during bending. Specifically, the coaxial subassemblies 34(1), 34(2) and the channel 40 may be disposed in the orthogonal cross-section 28(0) of the hybrid fiber optic cable 12 with mirror symmetry about the second axis $A_B(2)$ which may be parallel to a height $H_1$ of the channel 40. In this manner, the optical fibers 32(1), 32(2) may move lengthwise along the height $H_1$ of the channel 40 to increase the radius of curvature of the optical fibers 32(1), 32(2) and thereby reduce attenuation caused by a lower radius of curvature associated with tight bends of the hybrid fiber optic cable 12.

FIGS. 3A-3C illustrate details of the movement of the optical fibers 32(1), 32(2) relative to the channel along the length L of the channel 40 for a pinch bend 54 of the hybrid fiber optic cable 12. A pinch bend 54 may occur, for example, during a "bend back" whereby the optical fibers 32(1), 32(2) are bent approximately one-hundred eighty (180) degrees as depicted in FIG. 3A. In this example, the optical fibers 32(1), 32(2) begin at a center portion 56 of the channel 40 outside the pinch bend 54 but then move to an outer periphery 58 of the channel 40 during the bending as shown by the arrows $Z_1$, $Z_2$ in FIG. 3B. At the pinch bend 54 as depicted in FIG. 3C, the optical fibers 32(1), 32(2) may move to an inner periphery 59 of the channel 40 as the hybrid fiber optic cable 12 deforms and this movement is shown by arrow $Z_3$. The deformation of the cable jacket 30 is complex and depends upon the ability of the material of the cable jacket 30 to deform to accommodate the pinch bend 54.

Generally, an outer periphery 58 of the channel 40 may not be able to stretch under the influence of the bending force F and thereby the optical fibers 32(1), 32(2) move closer to an inner periphery 59 of the channel 40 at the pinch bend 54, as shown in FIG. 3C. It is noted that the outer periphery 58 of the channel 40 and the inner periphery 59 of the channel 40 are defined in this disclosure as portions of the channel 40 that are furthest and closest, respectively, from a center of curvature represented by axis $A_p$ for the pinch bend 54. FIG. 3B is a cutaway of the hybrid fiber optic cable 12 adjacent to the pinch bend 54 and depicts the optical fibers 32(1), 32(2) translating closer toward the outer periphery 58 of the channel 40. Consequently a larger bend radius $r_b$ of the optical fibers 32(1), 32(2) may be facilitated which reduces attenuation during bending and a potential for damage to the optical fibers 32(1), 32(2).

Figure 3D:
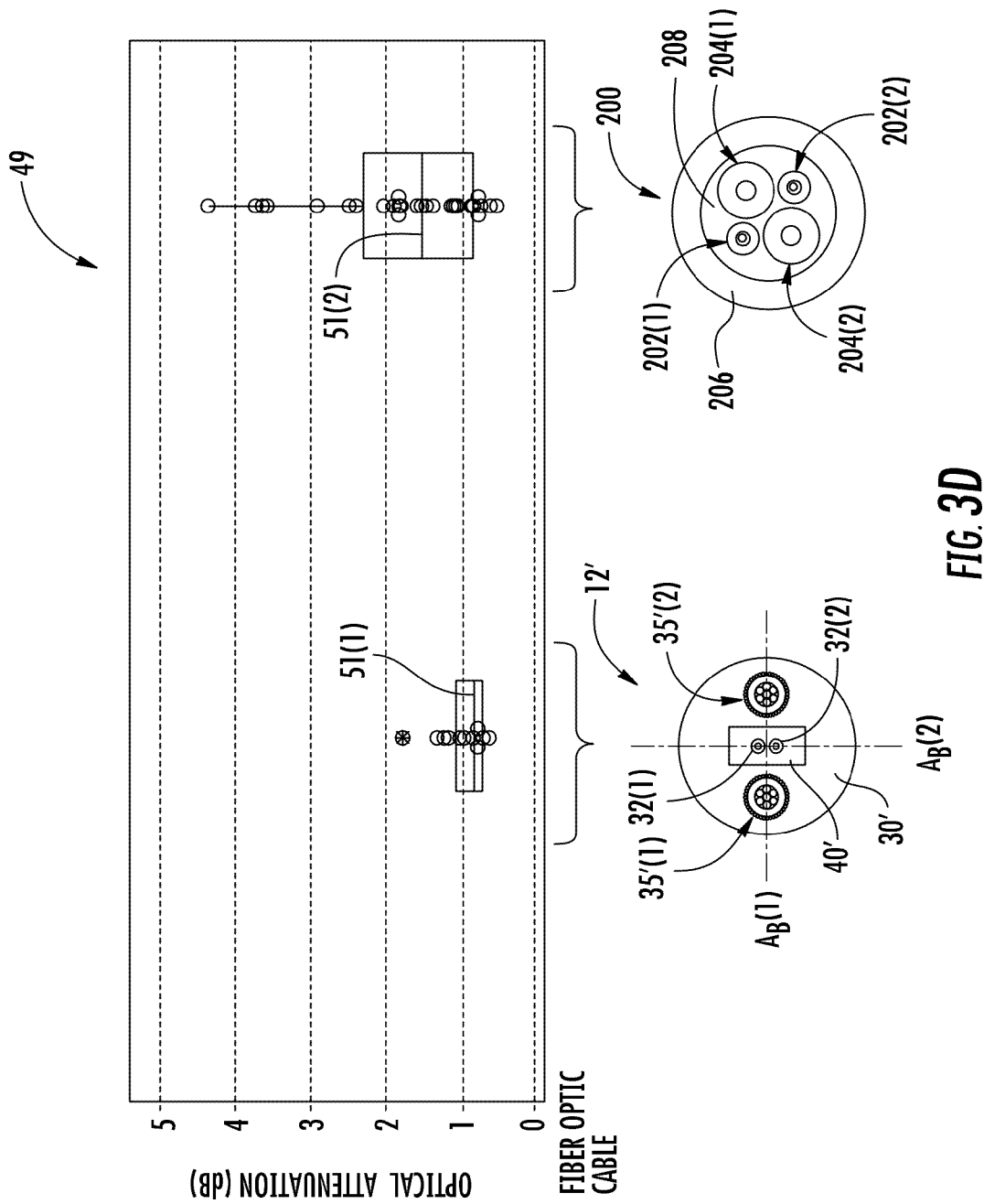
FIG. 3D is a chart depicting optical attenuation measured in decibels resulting from pinch bends of the optical fibers in the hybrid fiber optic cable of FIG. 1A versus attenuation from pinch bends of optical fibers in an exemplary conventional hybrid fiber optic cable.

FIG. 3D shows a chart 49 depicting exemplary attenuation data of an exemplary hybrid fiber optic cable 12' with a cable jacket 30' having a channel 40' therein, and optical fibers 32(1), 32(2). The hybrid fiber optic cable 12' is similar to the hybrid fiber optic cable 12 in FIG. 1A, but the electrical conductors 35'(1), 35'(2) are not the coaxial subassemblies 34(1), 34(2), thus apostrophes are used to differentiate. In this exemplary non-limiting case, each of the optical fibers 32(1), 32(2) includes a core diameter of eighty (80) microns and an outer diameter of two-hundred fifty (250) microns. The resulting median value of optical attenuation during a pinch test was less than one (1) decibel as labeled by a horizontal line 51(1) in the chart 49 of FIG. 3D.

In contrast, attenuation data for a conventional hybrid fiber optic cable 200 was collected. The conventional hybrid fiber optic cable 200 includes optical fibers 202(1), 202(2) and insulated electrical conductors 204(1), 204(2) disposed together within an outer jacket 206. It is noted that there is no channel 40 in the conventional hybrid fiber optic cable 200 of FIG. 3D facilitating the movement of the optical fibers 202(1), 202(2) and instead movement is restricted by the outer jacket 206 and the electrical conductors 204(1), 204(2). The resulting median value of optical attenuation during bending of the conventional hybrid optical cable was 1.5 decibels during a pinch test as labeled by a horizontal line 51(2) in the chart 49 of FIG. 3D. Accordingly, the attenuation during bending may be reduced with the use of the channel 40'.

Figure 4:
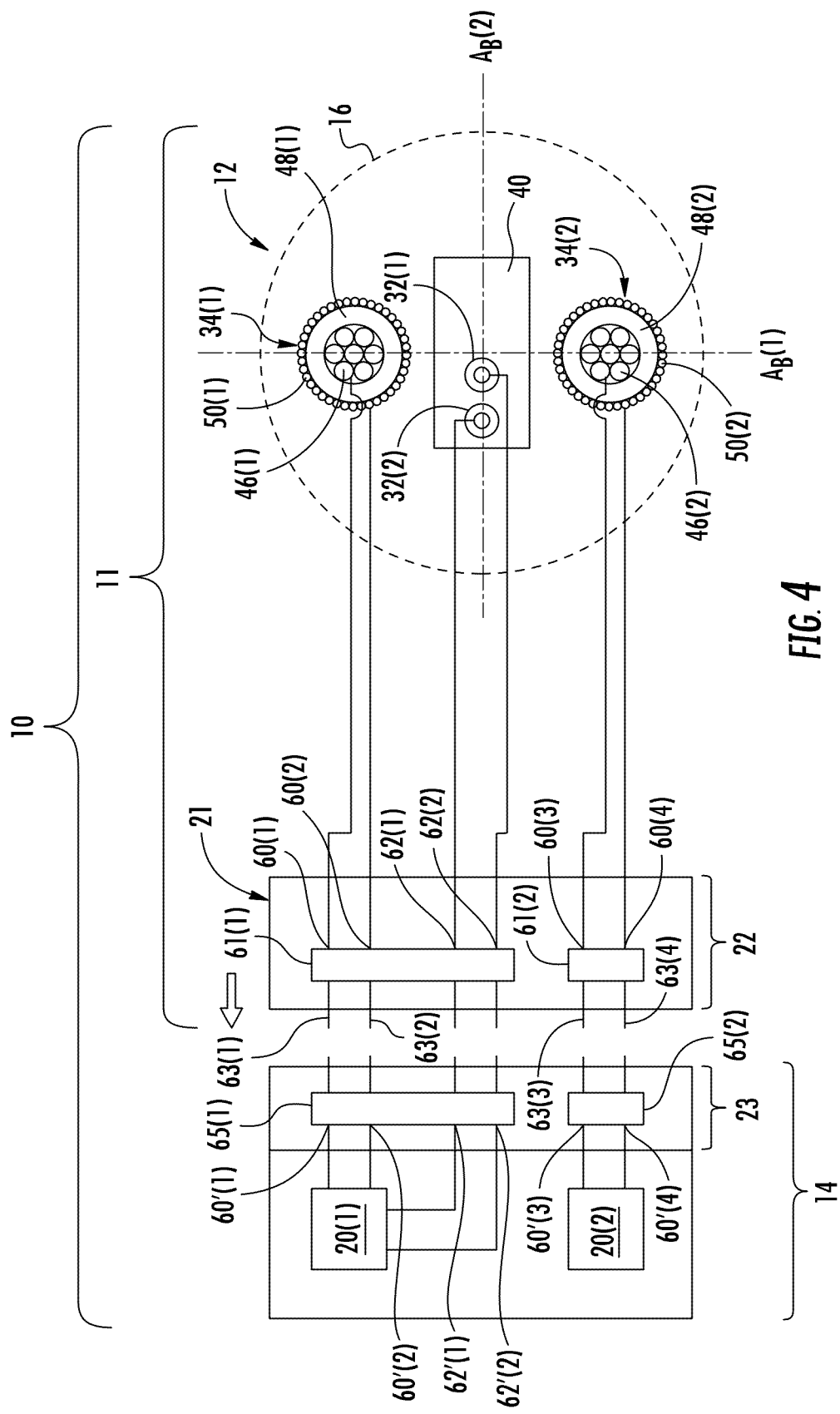
FIG. 4 is an exemplary schematic diagram of the connectorized system of FIG. 1A to illustrate controlling impedance by fully isolating coaxial subassemblies.

Now that the hybrid fiber optic cable 12 has been discussed in detail, the remainder of the connectorized system 10 will be discussed. FIG. 4 depicts a schematic of the connectorized system 10 comprising the hybrid fiber optic cable 12 and the fiber optic connector 22. The connectorized system 10 illustrates controlling impedance by fully isolating coaxial subassemblies.

As shown in FIG. 4, the hybrid fiber optic cable 12 may be optically and electrically connected to the device 14 though the fiber optic connector 22 having the fiber optic connector body 21. The hybrid fiber optic cable 12 and the fiber optic connector 22 are collectively called a connectorized cable 11. The fiber optic connector 22 may include at least one hub, for example, hubs 61(1), 61(2). The first end 16 of the hybrid fiber optic cable 12 may be attached to the hubs 61(1), 61(2) which may contain at least one electrical port 60(1)-60(4) configured to be electrically coupled to the at least one coaxial subassembly 34(1), 34(2). Each of the electrical ports 60(1)-60(4) may include electrical pins 63(1)-63(4) configured to form an electrical connection with at least one complementary hub 65(1), 65(2) of a complementary connector 23 of the at least one device 14.

The device 14 may include a plurality of electrical ports 60'(1)-60'(4) of the complementary connector 23 electrically coupled to the coaxial subassemblies 34(1), 34(2) through the electrical ports 60(1)-60(4), respectively. Further, at least one optical port 62(1), 62(2) may be optically connected to the optical fibers 32(1), 32(2) and to at least one optical port 62'(1)-62'(2) of the device 14. The electrical ports 60(1), 60(2) may be part of a first hub 61(1) and the electrical ports 60(3), 60(4) may be part of a second hub 61(2). In this manner, electrical isolation may facilitate better impedance control. The device 14 may include at least one circuit 20(1), 20(2). The inner conductor 46(1) of the first coaxial subassembly 34(1) and the outer conductor 50(1) of the first coaxial subassembly 34(1) may be electrically connected to the first circuit 20(1) of the at least one device 14. Moreover, the inner conductor 46(2) of the second coaxial subassembly 34(2) and the outer conductor 50(2) of the second coaxial subassembly 34(2) may be electrically connected to the second circuit 20(2) of the device 14. In this manner, the circuits 20(1), 20(2) may be electrically isolated from each other. Further, impedance may be controlled by the material and thickness $D_{TS}$ of the insulating layers 48(1), 48(2) of the coaxial subassemblies 34(1), 34(2) as each circuit 20(1), 20(2) receives electrical connectivity from only a single coaxial subassembly.

Figure 5:
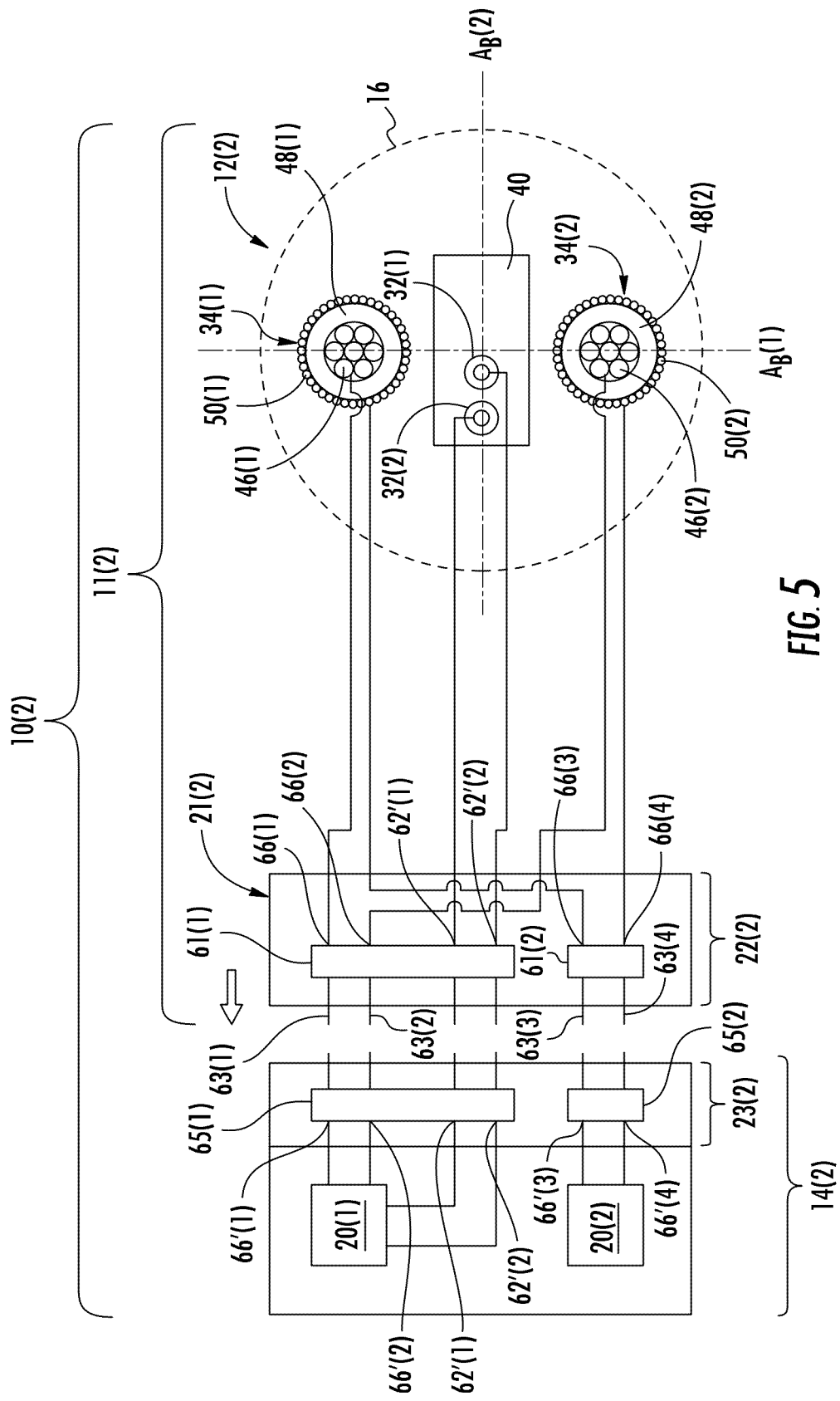
FIG. 5 is an exemplary schematic diagram of another example of a connectorized system to illustrate controlling impedance and reducing cost by providing connectivity to each circuit by using electrical conductors from different coaxial subassemblies.

FIG. 5 shows a connectorized system 10(2) which is another embodiment of the connectorized system 10. The connectorized system 10(2) illustrates controlling impedance and reducing cost by providing connectivity to each of the circuits 20(1), 20(2) using electrical conductors from different coaxial subassemblies. It is noted that unlike the connectorized system 10(1), the insulating layers 48(1), 48(2) isolate the electrical connections between circuits 20(1), 20(2) and thereby provide impedance control in this different embodiment.

The connectorized system 10(2) includes a hybrid fiber optic cable 12(2) and a fiber optic connector 22(2). The hybrid fiber optic cable 12(2) in FIG. 5 may be the same as the hybrid fiber optic cable 12 in FIGS. 1 and 4. However, in FIG. 5 the fiber optic connector 22(2) may include hubs 61(1), 61(2) comprising electrical ports 66(1)-66(4). The fiber optic connector 22(2) may facilitate the inner conductor 46(1) of the first coaxial subassembly 34(1) and the inner conductor 46(2) of the second coaxial subassembly 34(2) to be electrically connected to the first circuit 20(1) of the device 14(2). In this manner, the electrical ports 66(1)-66(2) of the fiber optic connector 22(2) may be electrically coupled to electrical ports 66'(1)-66'(2) of the device 14(2).

Further, the fiber optic connector 22(2) may facilitate the outer conductor 50(1) of the first coaxial subassembly 34(1) and the outer conductor 50(2) of the second coaxial subassembly 34(2) to be electrically connected to the second circuit 20(2) of the device 14(2) wherein the electrical ports 66(3)-66(4) of the fiber optic connector 22(2) may be electrically coupled to electrical ports 66'(3)-66'(4) of the device 14(2). In this manner, the sizes, known as the gauges, of the inner conductors 46(1), 46(2) or the outer conductors 50(1), 50(2) may be sized to the electrical requirements of the circuits 20(1), 20(2) while reducing unneeded conductive material to reduce cost.

For example, the inner conductor 46(1) of the first coaxial subassembly 34(1) and the inner conductor 46(2) of the second coaxial subassembly 34(2) may have a first gauge, for example 28 A.W.G. Moreover, the outer conductors 50(1), 50(2) of the first coaxial subassembly 34(1) and the second coaxial subassembly 34(2), respectively, may have a second gauge which may be greater than the first gauge. For example, the second gauge may be 32 A.W.G. Accordingly, the inner conductors 46(1), 46(2) may be of the lower gauge to reduce resistance and thereby carry more power to the circuit 20(1) for a given length L of hybrid fiber optic cable 12(2).

The connectorized system 10(2) in FIG. 5 provides robust opportunities to control impedance and reduce cost. For example, the lower resistance of the inner conductors 46(1), 46(2) associated with a small gauge may be used to increase the length L of the cable while keeping the impedance of the connectorized system 10(2) constant compared to the case when the inner conductors 46(1), 46(2) and the outer conductors 50(1), 50(2) have the same gauge. Lastly, providing coaxial subassemblies 34(1), 34(2) with outer conductors 50(1), 50(2) having a greater gauge than the inner conductors 46(1), 46(2) enables material cost savings of the outer conductors 50(1), 50(2) and may reduce unwanted mechanical stiffness of the coaxial subassemblies 34(1), 34(2) thus enabling the connectorized cable 11(2) to be more easily stored and/or attached to the device 14(2).

Figure 6:
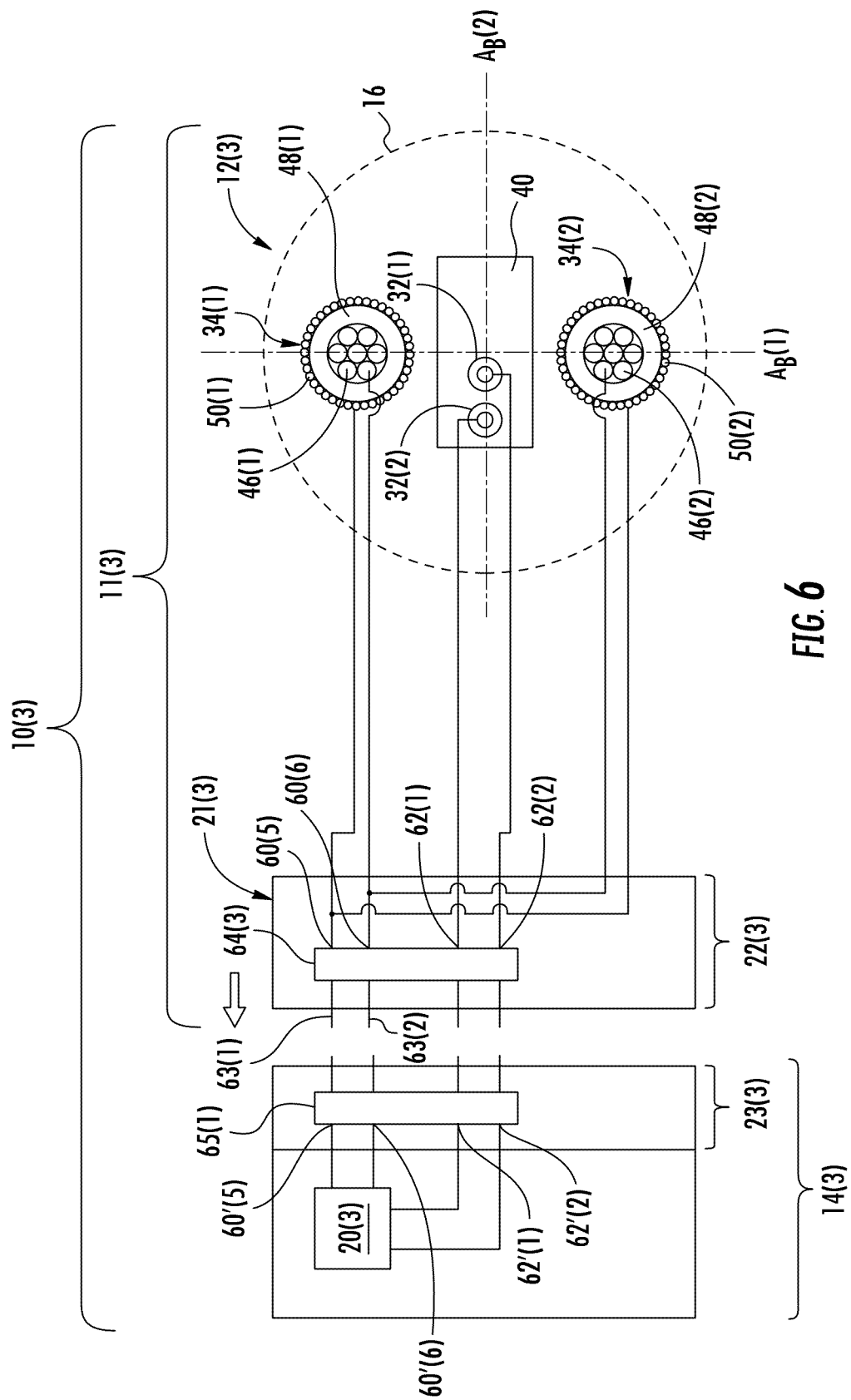
FIG. 6 is an exemplary schematic diagram of a further example of a connectorized system to illustrate controlling impedance and reducing cost by electrically coupling electrical conductors from different coaxial subassemblies.

FIG. 6 shows a schematic diagram of a connectorized system 10(3) which is another embodiment of the connectorized system 10. The connectorized system 10(3) illustrates controlling impedance and reducing cost by electrically coupling electrical conductors from different coaxial subassemblies. The connectorized system 10(3) may include a hybrid fiber optic cable 12(3) and fiber optic connector 22(3). The hybrid fiber optic cable 12(3) in FIG. 6 may be the same as the hybrid fiber optic cable 12 in FIGS. 1 and 4. However, in FIG. 6, the fiber optic connector 22(3) may include hub 64(3) comprising electrical ports 60(5), 60(6) configured to be electrically connected with electrical ports 60'(5), 60'(6) of a hub 65(1) of a complementary connector 23(3) of the device 14(3). The fiber optic connector 22(3) may facilitate the inner conductors 46(1), 46(2) of the first coaxial subassembly 34(1) and the second coaxial subassembly 34(2), respectively, to be electrically connected to each other and to the circuit 20(3) of the device 14(3).

Further, the fiber optic connector 22(3) may facilitate the outer conductor 50(1), 50(2) of the first coaxial subassembly 34(1) and the second coaxial subassembly 34(2), respectively, to be electrically connected to each other and to the circuit 20(3) of the device 14. In this manner, the resistance to bending of the hybrid fiber optic cable 12(3) may be reduced by providing the coaxial subassemblies 34(1), 34(2) supplying full electrical connectivity to the circuit 20(3) on opposite sides of the channel 40. In addition, impedance may be controlled by selecting a thickness and material of the insulating layers 48(1), 48(2), and sizes (gauges) of the inner conductors 46(1), 46(2) and outer conductors 50(1), 50(2).

Figure 7:
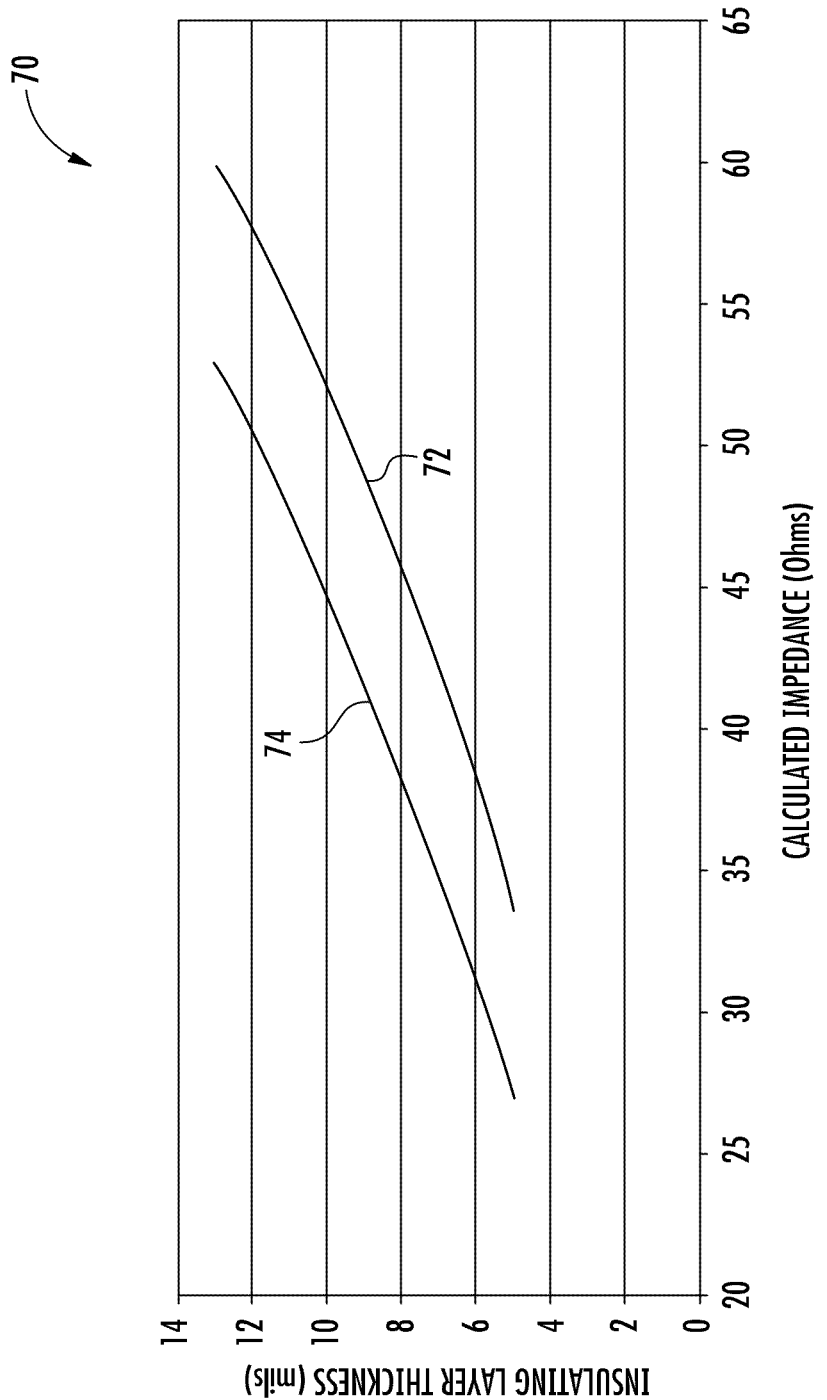
FIG. 7 is a chart of insulating layer thickness of the hybrid fiber optic cable of FIG. 1A versus a calculated impedance for the insulating layer comprising polytetrafluoro ethylene (PTFE) and expanded PTFE (ePTFE), respectively.

As a non-limiting example, the material of the insulating layers 48(1), 48(2) may comprise polytetrafluoroethylene (PTFE) and expanded PTFE (ePTFE) manufactured by W. L. Gore & Associates, Inc. of Newark, Del. To further illustrate by example, FIG. 7 is a chart 70 of dielectric thickness measured in mils (i.e., thousandths of an inch) versus a calculated impedance of a coaxial subassembly of PTFE and ePTFE, respectively, In the PTFE case, identified as curve 72 in FIG. 7, a coaxial subassembly including a 32 A.W.G. inner conductor, an insulating layer made of PTFE, and a 44 A.W.G. outer conductor has a calculated impedance which may be varied from 34 to 60 Ohms by changing the thickness of the PTFE from 5 to 13 mils. In the ePTFE case identified by curve 74 in FIG. 7, the calculated impedance may be varied from 27 to 52 Ohms by changing the thickness of the ePTFE from 5 to 13 mils. The calculated impedance is within a 30 to 60 Ohms range may be desirable for the device 14, which may be a mobile device.

Now that the relationship between the hybrid fiber optic cables 12, 12(2), 12(3) and the devices 14, 14(2), 14(3) have been introduced, other hybrid fiber optic cables 12(4), 12(5) are now discussed, which are other embodiments of the hybrid fiber optic cables 12, 12(2), 12(3). The hybrid fiber optic cables 12(4), 12(5) provide additional optical and/or electrical connections compared with the hybrid fiber optic cable 12.

Figure 8A:
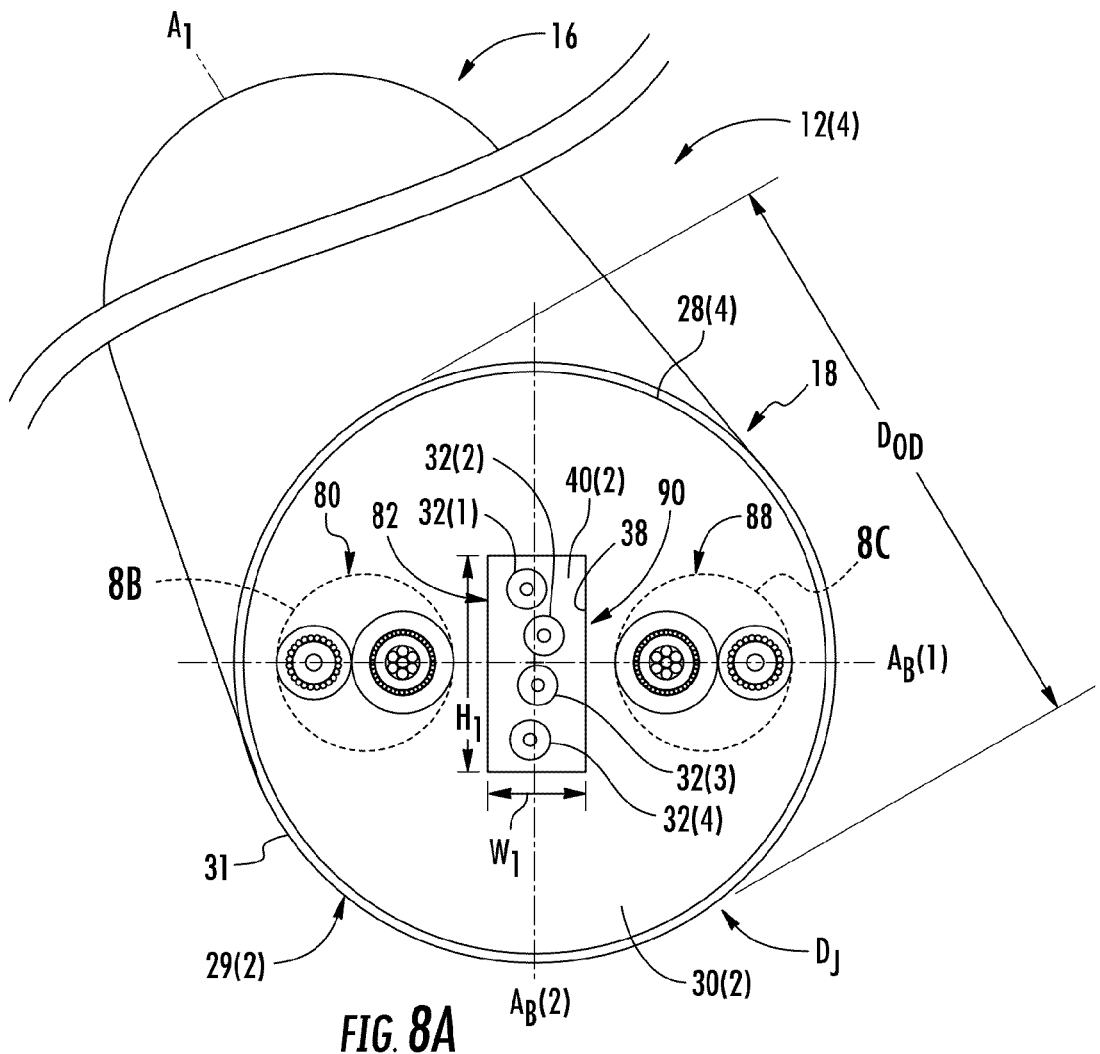
FIG. 8A is a perspective view of another example of a hybrid fiber optic cable including a first cluster and second cluster of coaxial subassemblies aligned and symmetrically disposed about a channel of a cable jacket.
Figure 8B:
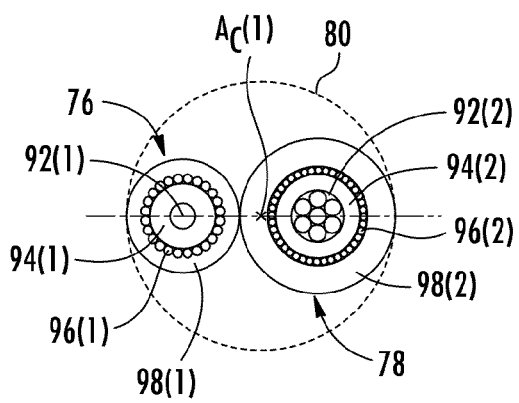
FIGS. 8B and 8C are partial views of FIG. 8A depicting close-ups of the first cluster and the second cluster, respectively.
Figure 8C:
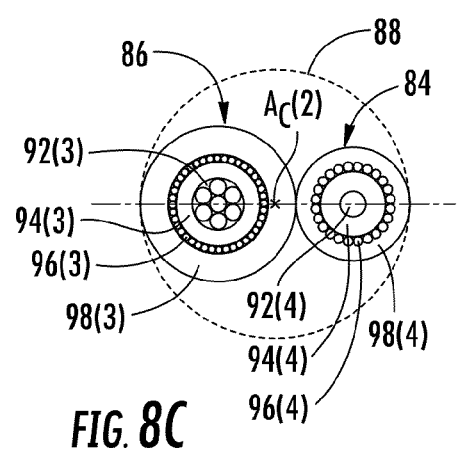

In this regard, FIGS. 8A-8C depicts the hybrid fiber optic cable 12(4) which includes a protective layer 29(2) with a cable jacket 30(2) having a channel 40(2) therein. The protective layer 29(2) may also comprise an outer protective layer 31, sometimes called a "skin layer" to provide additional protection from the environment. The protective layer 29(2) may comprise, for example, polymer material. The hybrid fiber optic cable 12(4) may be similar to the hybrid fiber optic cable 12. However, instead of the first coaxial subassembly 34(1) and the second coaxial subassembly 34(2), the hybrid fiber optic cable 12(4) includes a plurality of coaxial subassemblies 76, 78 disposed in a first cluster 80 adjacent to a first side 82 of the channel 40(2) and a second plurality of coaxial subassemblies 84, 86 disposed in a second cluster 88 adjacent to a second opposing side 90 of the channel 40(2) as shown in FIGS. 8B and 8C. The first cluster 80 and the second cluster 88 may have a first centroid axis $A_C(1)$ and the second cluster 88 may have a second centroid axis $A_C(2)$, respectively, within the orthogonal cross-section 28(4). The first centroid axis $A_C(1)$ intersects the orthogonal cross-section 28(4) at a geometric center of the coaxial subassemblies 76, 78 disposed in the first cluster 80. Similarly, the second centroid axis $A_C(2)$ intersects the orthogonal cross-section 28(4) at a geometric center of the coaxial subassemblies 84, 86 disposed in the second cluster 88. The first centroid axis $A_C(1)$ and the second centroid axis $A_C(2)$ may lie on the first axis $A_B(1)$. Also, the first cluster 80 and the second cluster 88 may provide mirror symmetry across a preferential bend axis $A_B(2)$ or the "second axis $A_B(2)$." In this manner, the hybrid fiber optic cable 12(4) may bend parallel to the second axis $A_B(2)$ as similarly shown for hybrid fiber optic cable 12 in FIG. 2A and thereby facilitate the movement of the optical fibers 32(1)-32(4) to reduce attenuation during bending.

Further, the coaxial subassemblies 76, 78, 84, 86 of the first cluster 80 and the second cluster 88 include inner conductors 92(1)-92(4), insulating layers 94(1)-94(4) surrounding the inner conductors 92(1)-92(4), outer conductors 96(1)-96(4) surrounding the insulating layers 94(1)-94(4), and second insulating layers 98(1)-98(4) surrounding the outer conductors 96(1)-96(4), respectively. In this manner, the second insulating layers 98(1)-98(4) insulate each coaxial subassembly 76, 78, 84, 86 from adjacent members of the coaxial subassemblies 76, 78, 84, 86. The details of the inner conductors 92(1)-92(4), the insulating layers 94(1)-94(4), and outer conductors 96A(1)-96(4) are similar to the inner conductor 46(1), insulating layer 48(1), and outer conductor 50(1) of the hybrid fiber optic cable 12 and thus will not be discussed further here in favor of conciseness.

Next, FIG. 9A depicts the hybrid fiber optic cable 12(5) which is another embodiment of the hybrid fiber optic cable 12. The hybrid fiber optic cable 12 extends from the first end 16 to the second end 18 and includes a cable jacket 30(3) of the protective layer 29(3) having a channel 40(3) therein. The hybrid fiber optic cable 12(5) may be similar to the hybrid fiber optic cable 12 and similar features will not be repeated for conciseness. However, the coaxial subassemblies 34(1), 34(2) of the hybrid fiber optic cable 12 are replaced in the hybrid fiber optic cable 12(5) with a first cluster 100(1) and a second cluster 100(2), respectively.

The contents of the first cluster 100(1) and the second cluster 100(2) are introduced first. As shown in FIG. 9B, the first cluster 100(1) includes coaxial subassemblies 102(1)-102(3) and a first centroid axis $A_C(1)$ of the coaxial subassemblies 102(1)-102(3). The first centroid axis $A_C(1)$ may intersect an orthogonal cross-section 28(5) at a geometric center of the coaxial subassemblies 102(1)-102(3) disposed within the orthogonal cross-section 28(5). As shown in FIG. 9C, the second cluster 100(2) includes coaxial subassemblies 102(4)-102(6) and a second centroid axis $A_C(2)$ of the coaxial subassemblies 102(4)-102(6). The second centroid axis $A_C(2)$ may intersect an orthogonal cross-section 28(5) at a geometric center of the coaxial subassemblies 102(4)-102(6) disposed within the orthogonal cross-section 28(5). The coaxial subassemblies 102(1)-102(6) includes inner conductors 104(1)-104(6) and insulation layers 106(1)-106(6) which surround the inner conductors 104(1)-104(6), respectively. The coaxial subassemblies 102(4)-102(6) further include outer conductors 108(1)-108(6) which surround the insulation layers 106(1)-106(6) and second insulation layers 110(1)-110(6) which surround the outer conductors 108(1)-108(6). In this example, six (6) coaxial subassemblies are provided with twelve electrical conductors which are configured to carry electrical signals.

Now that the contents of the first cluster 100(1) and the second cluster 100(2) have been introduced, the first centroid axis $A_C(1)$ and the second centroid axis $A_C(2)$ may lie on the first axis $A_B(1)$ as shown in the orthogonal cross-section 28(5) in FIG. 9A. In this manner, the hybrid fiber optic cable 12(5) may bend parallel to the second axis $A_B(2)$ similarly as discussed earlier for the hybrid fiber optic cable 12 as depicted in FIG. 2A and thereby facilitate the translation of the optical fibers 32(1)-32(4) lengthwise along the height $H_1$ of the channel 40(3) to minimize attenuation during pinch bends. Further, the electrical conductors and/or subassemblies may also serve as strength members and/or provide a bend preference to cables disclosed herein, as explained in U.S. application Ser. No. 13/489,867 filed Aug. 10, 2012 and U.S. application Ser. No. 13/559,102 filed Jul. 26, 2012, both of which are incorporated by reference herein in their entireties.

As used herein, it is intended that terms "hybrid fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets, or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A connectorized hybrid fiber optic cable allowing for optical fiber movement to reduce optical attenuation during bending, comprising:
   a hybrid fiber optic cable including
      a cable jacket having a channel disposed therein, the channel configured to allow optical fiber movement within the channel to reduce optical attenuation during bending,
      at least one optical fiber disposed within the channel and free of attachments to the channel, the at least one optical fiber configured to carry optical signals, and
      a first coaxial subassembly and a second coaxial subassembly are embedded within the cable jacket and configured to carry electrical signals; and
   a connector comprising at least one hub attached to an end of the hybrid fiber optic cable, the at least one hub including at least one electrical port electrically coupled to at least one of the first coaxial subassembly or the second coaxial subassembly, and at least one optical port optically coupled to the at least one optical fiber,
   wherein an inner conductor of the first coaxial subassembly and an outer conductor of the first coaxial subassembly are electrically connected to a first hub of the at least one hub, and
   an inner conductor of the second coaxial subassembly and an outer conductor of the second coaxial subassembly are electrically connected to a second hub of the at least one hub to provide impedance control of the first coaxial subassembly and the second coaxial subassembly.

2. The hybrid fiber optic cable of claim 1, wherein the cable jacket has an outer diameter less than 3.5 millimeters.

3. The hybrid fiber optic cable of claim 1, wherein the cable jacket comprises a UV-curable matrix.

4. The hybrid fiber optic cable of claim 1, wherein the cable jacket comprises multiple layers, and the outer layer comprises a skin layer.

5. The hybrid fiber optic cable of claim 1, wherein the first coaxial subassembly and the second coaxial subassembly are symmetrically disposed to each other in an orthogonal cross-section.

6. The hybrid fiber optic cable of claim 1, wherein the first coaxial subassembly, the second coaxial subassembly, and the channel are disposed in an orthogonal cross-section of the hybrid fiber optic cable with mirror symmetry about a preferential bend axis parallel to a width of the channel.

7. The hybrid fiber optic cable of claim 1, wherein the channel has an aspect ratio of at least 1.5 which is calculated by dividing a height of the channel by a width of the channel.

8. The hybrid fiber optic cable of claim 1, wherein spacing between centers of the first coaxial subassembly and the second coaxial subassembly is in the range of 0.45 to 0.8 times an outside diameter of the cable.

9. The hybrid fiber optic cable of claim 1, wherein the first coaxial subassembly is configured to carry electrical power signals, and the second coaxial subassembly is configured to carry electrical data signals.

10. The hybrid fiber optic cable of claim 1, wherein the first coaxial subassembly is disposed adjacent to a first side of the channel, and the second coaxial subassembly is disposed adjacent to a second opposing side of the channel.

11. The hybrid fiber optic cable of claim 1, wherein:
   at least one optical fiber comprises a plurality of optical fibers; and
   a width and a height of the channel are sized such that a first optical fiber of the plurality of optical fibers is allowed to move past a second optical fiber of the plurality of optical fibers.

* * * * *